UNITED STATES PATENT OFFICE.

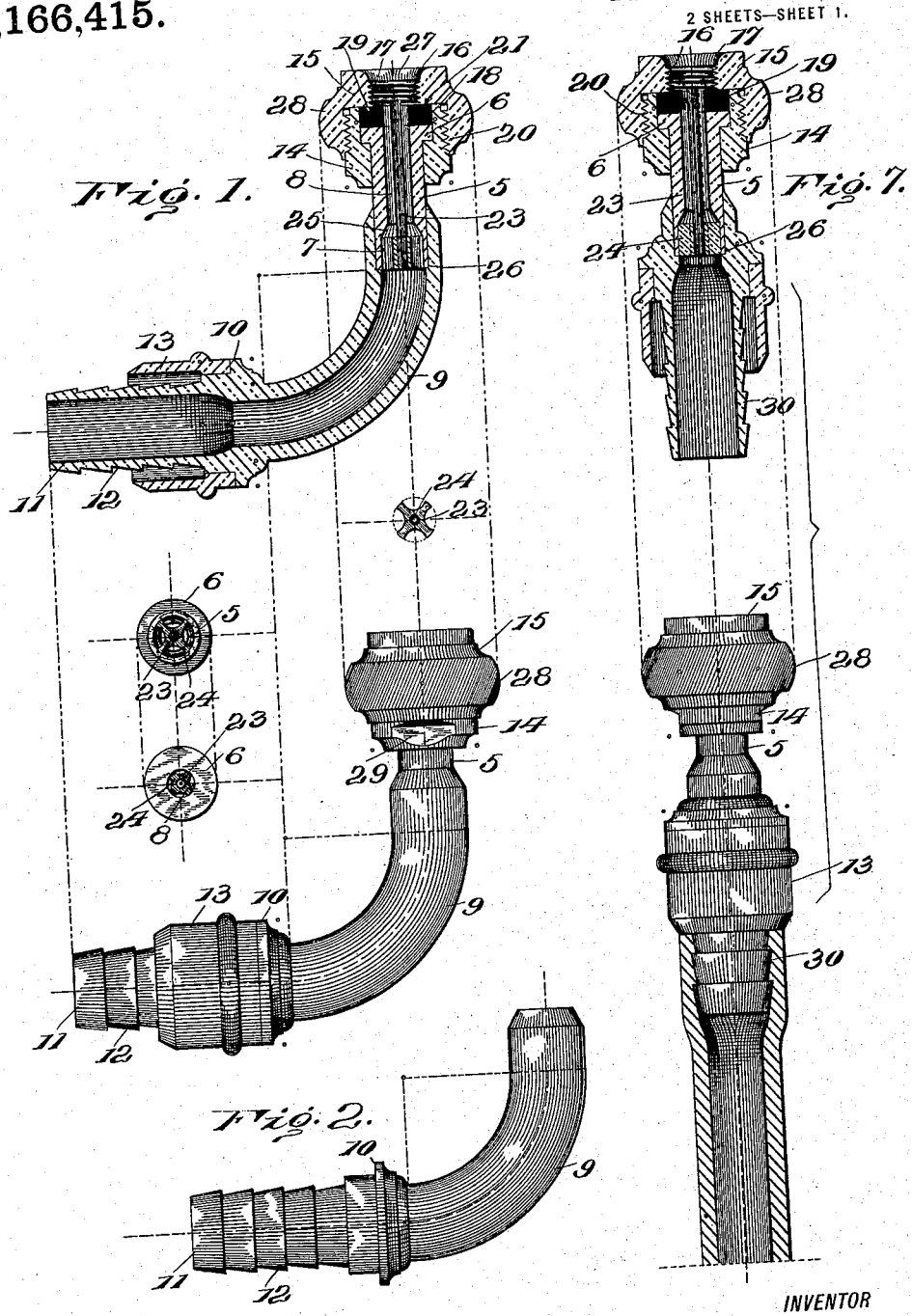

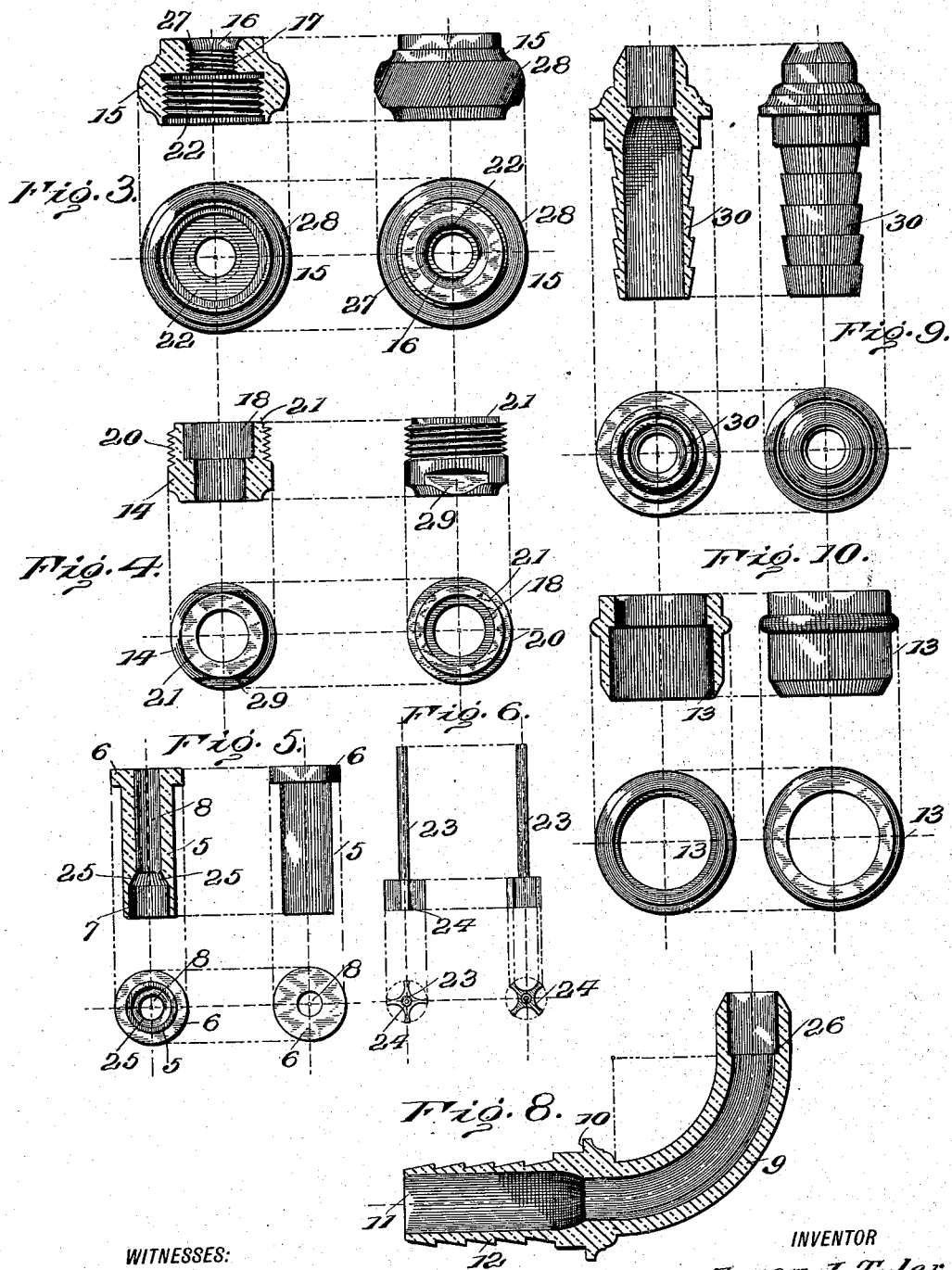

AARON J. TYLER, OF ROCHESTER, NEW YORK.

PNEUMATIC COUPLING.

1,166,415.   Specification of Letters Patent.   Patented Dec. 28, 1915.

Application filed September 27, 1912. Serial No. 722,757.

*To all whom it may concern:*

Be it known that I, AARON J. TYLER, citizen of the United States, residing at Rochester, in the county of Monroe and State of New York, have invented certain new and useful Improvements in Pneumatic Couplings, of which the following is a specification.

This invention relates to pneumatic couplings and more particularly to that class of couplings especially designed for connecting pneumatic pumps to the inflation valves of automobile tires and the like.

The primary object of the invention is to provide a pneumatic coupling of simple and durable construction which shall automatically unseat the tire valve of an automobile when connected therewith and hold said valve in open position until the inner tube of the tire is properly inflated, and permit said valve to automatically close when the coupling is disconnected therefrom.

A further object of the invention is to provide a coupling, the construction of which is such that when the coupling is connected with a tire valve to open the same, the air in the inner tube of the tire may flow through the coupling to the pressure gage of the pump and thus permit the operator, by inspecting the gage, to determine the pressure of the air in the inner tube either before or after inflation.

A further object is to provide a coupling including a tubular body portion having a sectional head swiveled thereon, there being a packing interposed between the tubular body portion and head and securely held against accidental displacement by engagement with said body portion and one of the sections of the head.

A further object is to provide a coupling which shall be thoroughly reliable under all conditions and in which ample clearance is afforded for the passage of air therethrough, thus reducing friction to a minimum and consequently increasing the efficiency of the device.

A still further object of the invention is generally to improve this class of devices so as to increase their utility, durability and efficiency, as well as to reduce the cost of manufacture.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 represents a longitudinal sectional view and a side elevation of a pneumatic coupling constructed in accordance with my invention, a bottom plan view and top plan view of the tubular body portion, with the valve unseating member in position thereon, being also shown and likewise a bottom plan view of the spider of the valve unseating member; Fig. 2 is a side elevation of the curved pipe section or elbow with the clamping ring and coupling head removed; Fig. 3 represents a vertical sectional view, bottom plan view, side elevation and top plan view of the outer section of the coupling head; Fig. 4 represents a vertical sectional view, top plan view, side elevation and bottom plan view of the inner section of the coupling head; Fig. 5 represents a vertical sectional view, bottom plan view, side elevation and top plan view of the tubular body portion with the valve unseating member removed; Fig. 6 represents a side elevation and bottom plan view of the valve unseating member detached, a second side elevation taken from a different angle and a cross sectional view of the valve unseating member being also shown; Fig. 7 represents a sectional view and a side elevation partly in section of a coupling having a straight shank or pipe for connection with an air conductor; Fig. 8 is a vertical sectional view of the curved section or elbow shown in Fig. 2; Fig. 9 represents a vertical sectional view, bottom plan view, side elevation and top plan view of the hose attaching member shown in Fig. 7; Fig. 10 represents a vertical sectional view, bottom plan view, side elevation and top plan view of the clamping collar shown in Figs. 1 and 7.

Corresponding and like parts are referred to in the following description and indicated in all the views of the accompanying drawings by the same reference characters.

The improved coupling forming the subject matter of the present invention comprises a tubular body portion 5 having one end thereof provided with a laterally extending flange 6 and its other end hollowed out to form a seat or chamber 7 which communicates with the longitudinal bore 8 of the tubular body portion, as shown. Secured in any suitable manner to the small end of the body portion, is an elbow section 9 having a circumferential shoulder 10 defining a longitudinally disposed nipple 11, the walls of which are roughened or corrugated at 12 for engagement with an air conductor of any suitable construction, such for instance as a flexible hose, not shown. Surrounding the elbow 9 and bearing against the shoulder 10, is a clamping collar or sleeve 13, which is fitted over the adjacent end of the hose and the latter, together with the collar, forced over the corrugated end of the nipple 11, thereby firmly clamping the hose on the nipple and at the same time affording a protection for the end of said hose.

Mounted for rotation on the tubular body portion 5, is a coupling head comprising inner and outer sections 14 and 15, one of which receives the flange 6 on the body portion, while the other is provided with a central opening 16, the walls of which are threaded at 17 for detachable connection with the correspondingly threaded end of an ordinary tire valve. The upper face of the flange 6 is preferably spaced inwardly from the adjacent end of the inner head section 14 to form a pocket or chamber 18 for the reception of a flexible packing 19, preferably formed of leather, rubber or other yieldable material and against which the adjacent end of the tire valve abuts when the coupling is connected therewith, so as effectually to prevent the escape of air during the inflation of the inner tube of the tire.

The inner head section 14 is exteriorly threaded at 20 for engagement with corresponding interior threads formed on the outer section 15, so that said sections may be readily removed when it is desired to disconnect the parts to permit renewal or replacement of the packing. It will here be noted that when the outer section 15 is screwed home on the lower section 14, the packing 19 will be effectually held against accidental displacement. It will also be noted that the inner wall of the pocket 18 is smooth and devoid of threads so as to prevent accidental dislodgment of said packing, when securing the sections together or unscrewing said sections for any reason.

The upper end of the lower section 14 is provided with a smooth flat bearing surface 21 which bears against a correspondingly smooth flat bearing surface 22 formed on the lower face of the outer head section 15 when the sections are screwed together. Thus it will be seen that when the sections 14 and 15 are screwed together, the inner section, by engagement with the outer section, will form in effect a lock so as to prevent independent rotation of said sections and consequently cause the sections of the coupling head to rotate together on the tubular body portion and form in effect a swivel connection between said coupling head and body portion. The flat face 22 of the outer section 15, by engagement with the adjacent surface of the packing, also serves to prevent accidental displacement of said packing, as before stated.

Arranged within the tubular member 5, is a valve unseating member comprising a stem 23 which extends longitudinally of and is spaced slightly from the walls of the bore 8 so as to permit the free passage of air through said body portion to the inner tube of the tire. One end of the stem 23 normally projects a short distance beyond the outer face of the packing 19 for engagement with the valve stem of the tire valve, while the other end of the spindle is provided with a spider 24, the arms of which bear against and are secured in any suitable manner to the walls of the seat or chamber 7.

The coupling is designed for attachment to a pneumatic pump having a pressure gage connected thereto and the object of the spider 24 is to permit the air in the inner tube of an automobile tire to pass between the arms of the spider to the pressure gage so that the operator by glancing at the pressure gage may determine the degree of air pressure in the inner tube, either before or after inflation thereof. The space between the arms of the spider and around the stem 23 also affords ample clearance for the flow of air to the inner tube when inflating the tire, thus reducing friction between the parts to a minimum and consequently materially increasing the efficiency of the device.

The wall of the chamber 7 is preferably inclined or beveled at 25 to assist in directing the air from the pump into the bore of the tubular body portion, while the elbow 9 is formed with an annular shoulder 26 against which the adjacent end of said body portion abuts when the parts are assembled.

Thus it will be seen that by positioning the coupling head on the threaded end of a tire valve and rotating said coupling head, the end of the stem 23 will bear against and move the tire valve to open position so as to permit air from the pump or compressor to be forced through the coupling head into the inner tube of the tire. As the coupling head is screwed onto the tire valve, the end of the tire valve will bear against the packing 19, thereby to effectually prevent the escape of air from the inner tube during the pumping operation. When the coupling head is first attached to the tire valve and said tire valve opened by engagement with the stem of the valve unseating member, air from the tire valve may flow through the elbow and conductor to the pressure gage of the pump and thus indicate to the operator the quantity of air necessary to be forced into the inner tube to properly inflate the same. After the inflation of the inner tube has been effected, the coupling head is rotated in the reverse direction, that is to say, unscrewed from the tire valve which operation releases the stem 23 and permits the tire valve to automatically close and retain the air within the inner tube of the tire in the ordinary manner.

The walls of the opening 16 are preferably inclined or beveled at 27 to assist in guiding the coupling head to the nipple of the tire valve. The exterior surface of the outer head section 15 is also preferably roughened or knurled as indicated at 28 to assist in obtaining a good grip on the head, while the exterior surface of the inner head section 14 is preferably provided with oppositely disposed flattened portions 29 for engagement with a wrench or other suitable tool so as to hold the outer sections while the sections 14 and 15 are being locked or unlocked.

In Figs. 7 and 9 of the drawings, there is illustrated a modified form of the invention in which the curved elbow 9 is eliminated and the coupling head attached directly to a straight nipple 30, the construction and operation of the device shown in Fig. 7 being otherwise similar to the coupling shown in Fig. 1 of the drawings.

From the foregoing description, it will be seen that there is provided a pneumatic coupling of simple and durable construction which is thoroughly reliable under all conditions and which not only serves to permit the passage of air from a compressor to the inner tube of the tire when inflating the same, without undue friction between the parts, but also permits the operator to determine the pressure of the air in the inner tube prior to inflating the same or after the inflation thereof has been effected.

Having thus described the invention, what is claimed as new is:

1. A coupling for connecting a pump to a tire valve including a tubular body having one end thereof provided with a flange and its other end formed with an interior chamber communicating with the bore of the body, the wall of said chamber being inclined in the direction of said bore, a coupling head swiveled on the body around the flange thereon and provided with an opening, the walls of which are provided with means for engagement with a tire valve, a packing interposed between the body and the head and having an opening therein, and a valve unseating member including a stem having one end thereof projecting through the opening in the packing and its other end formed with a spider secured in the chamber at the end of the body.

2. A coupling for connecting a pump to a tire valve comprising a tubular body having an external annular flange at one end and provided at its opposite end with an internal chamber communicating with its bore, a pipe secured upon and extending from the chamber at the end of the body, a valve-unseating member consisting of a slender stem extending through the bore of the body and a spider formed on one end of the stem and secured in the chamber at the end of the body, an inner head section fitted loosely around the body and the flange thereon and having a smooth bored portion extending beyond the end of the body, said smooth bored portion terminating in a plane radial face, an outer head section detachably secured upon the inner head section and provided with an internal annular radial shoulder adapted to bear against the annular plane radial face of the inner section and extend inwardly beyond said face, said outer section being provided with an opening extending from said internal annular shoulder to engage a tire valve, and a packing fitted within the smooth bored portion of the inner head section and compressed between the end of the tubular body and the internal annular shoulder on the outer head section.

3. A pneumatic coupling comprising a tubular body having an external flange at one end and an enlarged chamber at the opposite end, a packing placed against the flanged end of the body, a sectional head, the inner section slipped upon the body against the lower face of the external flange and formed with an externally threaded portion encircling the said flange and packing, and the outer section placed against the said packing and the threaded portion of the inner section and formed with an internally threaded portion engaging the externally threaded portion of the inner section, and a valve unseating member comprising a stem and spider, the stem passing through the body of the coupling and the packing and the spider being secured in the enlarged chambered end of the tubular body.

In testimony whereof I affix my signature in presence of two witnesses.

AARON J. TYLER. [L. S.]

Witnesses:
ADELAID A. MILLER,
EMMA E. TYLER.